July 24, 1928.　　　　　　　　　　　　　　　1,678,134
H. I. CROMER
REAPING OR HARVESTING MACHINE FOR HARVESTING
HEMP OR SIMILAR STALKS OR CROPS
Filed Aug. 25, 1924　　　4 Sheets-Sheet 1
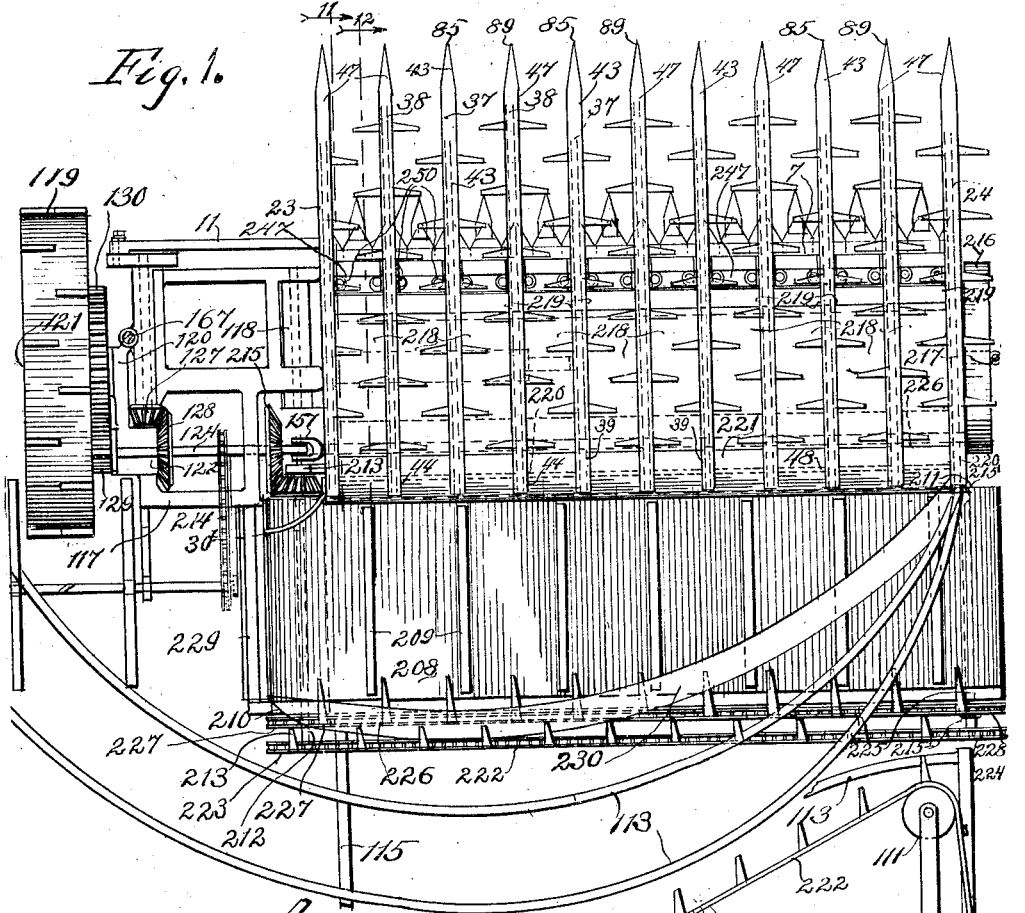
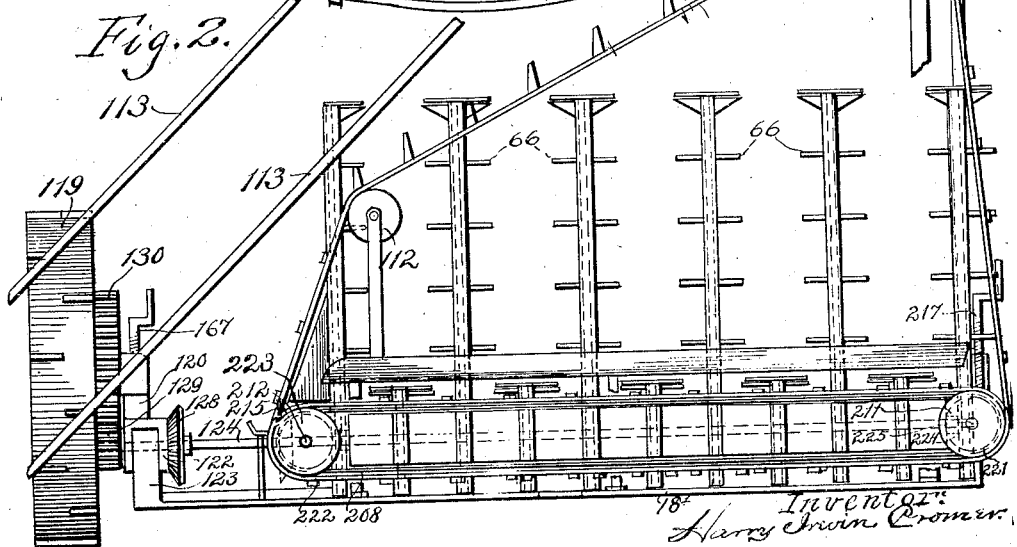

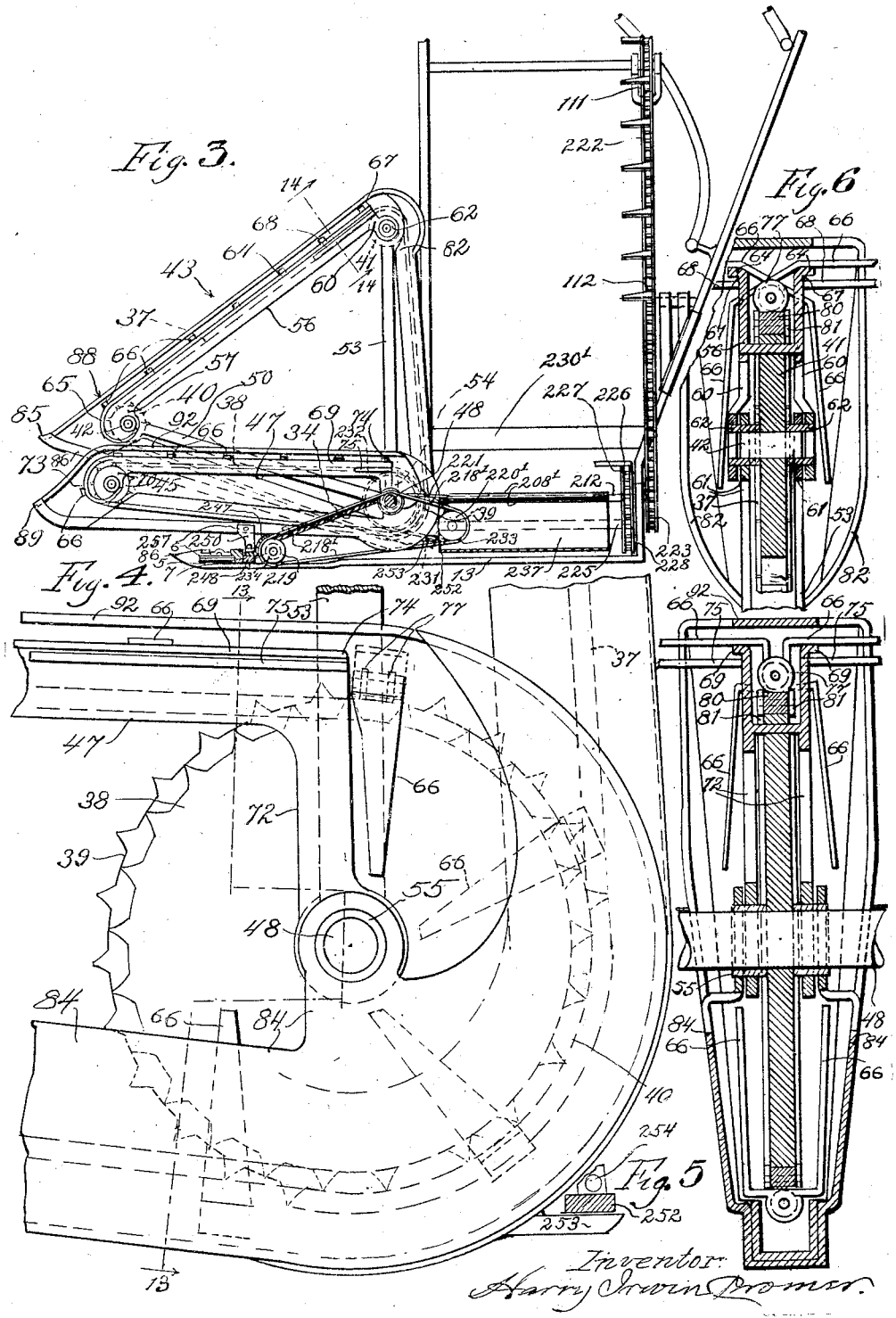

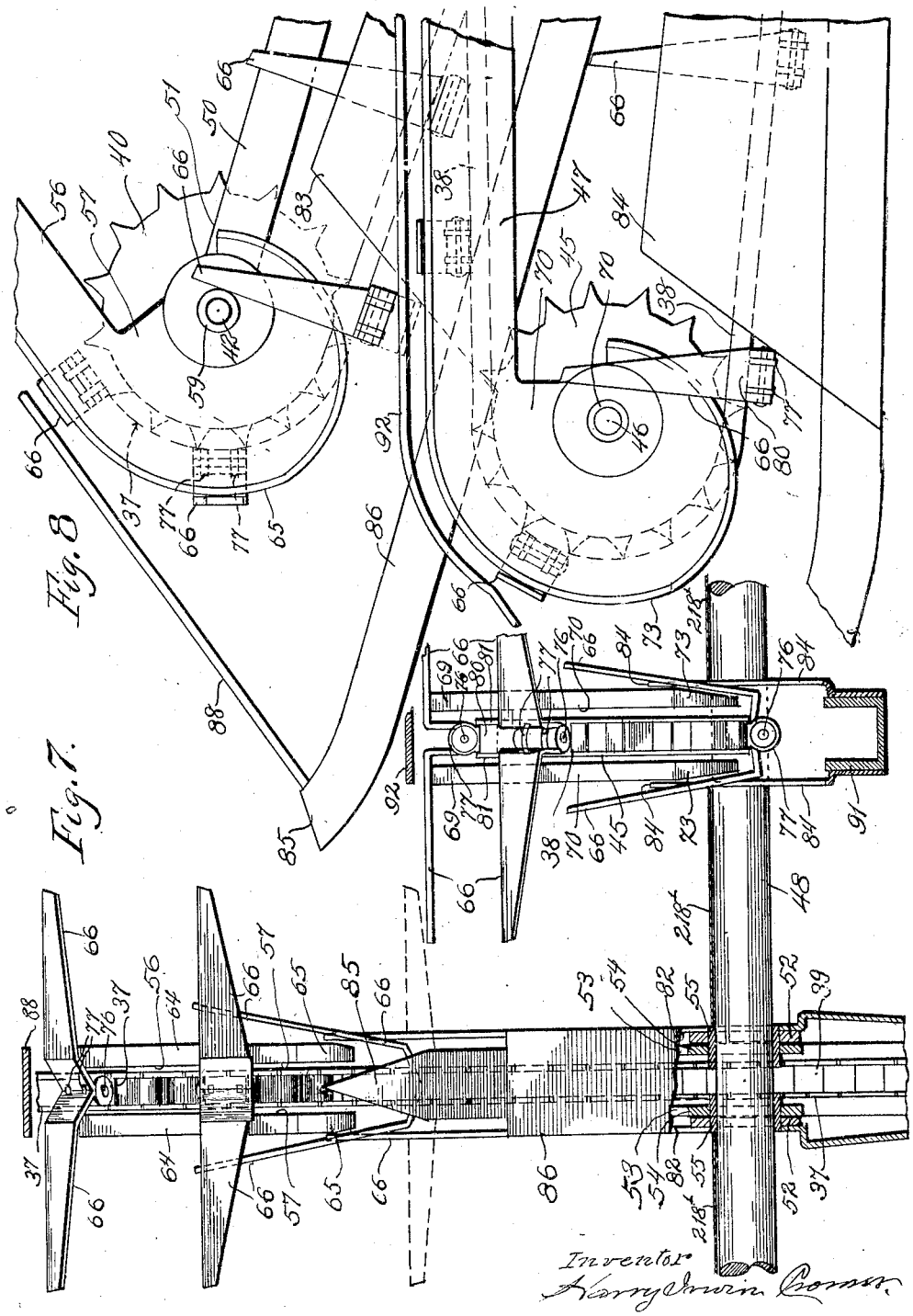

July 24, 1928.
H. I. CROMER
REAPING OR HARVESTING MACHINE FOR HARVESTING
HEMP OR SIMILAR STALKS OR CROPS
Filed Aug. 25, 1924    4 Sheets-Sheet 4
1,678,134
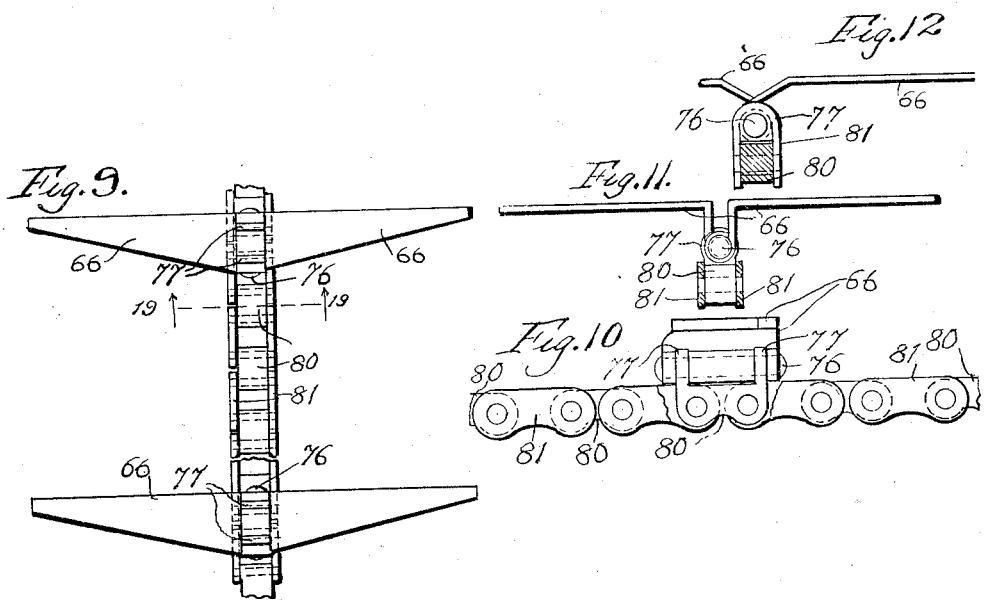

Patented July 24, 1928.

1,678,134

UNITED STATES PATENT OFFICE.

HARRY IRWIN CROMER, OF OAK PARK, ILLINOIS.

REAPING OR HARVESTING MACHINE FOR HARVESTING HEMP OR SIMILAR STALKS OR CROPS.

Application filed August 25, 1924. Serial No. 733,969.

This invention relates to reapers or harvesting machines which are capable of being successfully used for harvesting hemp or similar stalks or crops.

The principal object of the invention is to provide a simple, economical and efficient reaper or harvesting machine, and more particularly, an improved reaper or harvesting machine adapted to successfully harvest hemp or similar stalks or crops, and to either cut and lay such stalks in swaths, or to deposit them in position to be bound in bundles while supported on the machine, or otherwise, as desired.

Other and further objects of the invention will appear from the following description and claims, and from an inspection of the accompanying drawings, which are made a part hereof.

The invention consists in the features, combinations, details of construction and arrangement of parts herein described and claimed.

In the accompanying drawings:—

Figure 1 is a plan view of a reaping or harvesting machine constructed in accordance with my invention, and showing said invention in a simple form as applied to an ordinary reaping machine of the type commonly known as a self-rake, which reaping machines or self-rakes are in common use and well known to those skilled in the art to which this invention relates;

Fig. 2 is a view in rear elevation of the machine shown in Fig. 1, with parts of the rear downwardly inclined curved guiding rods for supporting and guiding the cut stalks transversely of the machine and depositing them on a receptacle on the machine or in a swath upon the ground, broken away;

Fig. 3 is a view in vertical section taken on line 11 of Fig. 1, looking in the direction indicated by the arrows;

Fig. 4 is an enlarged detail view taken on line 12 of Fig. 1 showing the arrangement of the rear lower portions of the lower and upper hinged-toothed feed chains, their supports, and the shaft and sprocket means for operating said chains;

Fig. 5 is an enlarged detail view in transverse section, taken on line 13—13 of Fig. 4 looking in the direction indicated by the arrows;

Fig. 6 is an enlarged detail view in transverse section, taken on line 14—14 of Fig. 3, looking in the direction indicated by the arrows;

Fig. 7 is an enlarged detail view showing the front portions of an upper and lower hinged-toothed feed chain and the supports for the same; such as are shown in Fig. 3;

Fig. 8 is a side view in elevation of the parts shown in Fig. 7;

Fig. 9 is a detail view of a preferred form of foldable-toothed or hinged-toothed feed chain;

Fig. 10 is a view in side elevation of the foldable-toothed feed chain shown in Fig. 9;

Fig. 11 is a transverse sectional view taken on line 19—19 of Fig. 9, looking in the direction indicated by the arrows; and Fig. 12 is a similar transverse sectional view of a modified form of foldable-toothed feed chain.

In constructing an improved reaper or harvesting machine for harvesting hemp or other similar stalks or crops, in accordance with my invention, I provide a reaper or harvesting machine 1 which may be of the ordinary and well known form commonly known as a self-rake, but from which the rake arms and the cam and roller mechanism for operating the rake arms have been removed or omitted.

Such a machine is shown in Figs. 1, 2 and 3, with the rake arms and cam and roller mechanism for operating the same omitted or dispensed with, and with my invention and improvements on and forming a part of an improved reaper or harvesting machine which being thus provided with my improvements, is adapted to be successfully used for harvesting hemp, or similar stalks or crops in accordance with my invention.

In the form of the machine shown in said Figures 1, 2 and 3 of the drawings, the usual cutter or sickle 5, having a sickle blade or reciprocating knife 6, cutter-bar or cutter-supporting bar 7, and sickle guards 86, is provided. And the machine is provided with any ordinary and well known or desired or suitable means for operating the sickle. For example, a pitman or connecting rod 11, and any ordinary and well known or desired means for operatively connecting the connecting rod or pitman 11 with a traction wheel 119, or other source of power, is of course provided. The bottom frame comprising frame members 13 and 18', as shown in Figs. 2 and 3, is connected with the sickle-supporting bar 7, and is pivotally connected with or hinged to the machine frame 117 by means of a suitable hinge 118. The machine frame 117, shown in Fig. 1, is connected with the bull wheel or traction wheel 119 in the usual and well known manner, by means of a pivoted or hinged frame arm 120 on the frame 117, and an axle 121 mounted on said frame arm and extending through the hub and axial center of the bull wheel, which is thus adapted to support the machine frame and the operating parts of the machine mounted on the frame.

The pitman 11 is operatively connected with the traction wheel 119 in the usual or any desired ordinary and well known manner, for example, by means of a crank 125 fixed to a crank shaft 126 which is journaled in the frame 117 and provided with a bevel pinion 127 fixed to said crank shaft and in toothed engagement with a bevel gear wheel 128 fixed to a transverse horizontal shaft 124, said shaft 124 having a spur gear wheel 129 fixed thereto and in toothed engagement with a spur gear wheel 130 which is on or fixed to and rotative with the traction wheel 119, said traction wheel being rotative on the axle 121 already described. (See Figs. 1 and 2.)

A downwardly and forwardly inclined bottom member or leaf 34, which is located adjacent to or back of the cutter-supporting bar 7 and cutter or sickle, is, by preference flexibly connected with the cutter-supporting bar. And the forward edge of the inclined bottom member or leaf 34 is adapted to move upward and downward with the cutter-supporting bar. In the form of the device shown in the accompanying drawings, the cutter-supporting bar and said inclined bottom member or leaf 34 are adapted to move upward and downward with respect to the rear bottom portion or frame comprising the frame members 13 and 18' already described.

Mounted upon or over and in position to extend forward and rearward of the cutter-supporting bar and sickle is a series of feeding and conveyor devices which comprises, by preference, a series of foldable-toothed feed chains 37 and 38 which are, by preference, in the form of endless sprocket chains having extensible and retractable or foldable feeding teeth thereon which are adapted to be carried forward while in retracted or folded position, and to move rearward and upward at an incline from a position in front of the cutter-supporting bar and sickle, over and rearward beyond said cutter bar and sickle and above the level of the stalk-supporting bottom or stalk-supporting conveyor elements located back of the cutter-supporting bar, while said feeding teeth are in extended, stalk-engaging feeding position.

The upper toothed feed chains 37 are, by preference, mounted on rear driving sprocket wheels 39, forward idler wheels 40, and rear upper idler wheels 41, all of said wheels being by preference supported upon angular feed-chain supporting arms or frames 43 which extend, by preference, over and forward and rearward with respect to the sickle and cutter-supporting bar. The driving sprocket wheels 39 are each mounted on a driving shaft 48 located back of and in approximately parallel relation to the cutter or sickle. The forward idler chain-supporting wheels 40 are each, by preference, located forward of the cutter or sickle; and the upper rear idlers 41 are each, by preference located back of the sickle and above the level of and in the same vertical plane with the corresponding driving sprocket 39 and forward idler wheel 40. (See Figs. 3 and 4.)

Each of the feed chains 37 thus has an upwardly and rearwardly inclined feeding lap which extends and is adapted to travel upward and rearward over the cutter-supporting bar and sickle from in front of said bar and sickle to the rear of the same; and said upper rearwardly moving feeding laps are each in the same vertical plane with the return or forwardly moving lower lap of the same chain, the teeth on the upper lap being extended, and those on the lower lap being folded or retracted, as will more fully hereinafter appear. The stalks cut by the sickle are thus supported between said feed chains and conveyed rearward in approximately upright position, but, by preference, with the stalks somewhat inclined rearward.

The chain-supporting idler wheels 40 and 41 are each provided with a supporting axle or stub shaft 42, the opposite ends of which are supported in the corresponding supporting frame or arm 43. And the driving sprockets 39 are each in the same vertical plane with the idlers 40 and 41 which support the chain driven by such driving sprockets respectively.

The lower toothed feed chains 38 are each located, by preference, between a pair of adjacent upper feed chains 37, and between a corresponding pair of feed chain supporting frames or arms 43, and are adapted to engage and carry or feed the bottom extremities of the upright somewhat inclined stalks rearward between said upper feed chains 37, and between adjacent upper chain-supports 43, the bottom ends of the cut stalks being supported upon the forward inclined bottom member or leaf 34, which may be provided with an endless apron or series of endless aprons 218' mounted beltlike on parallel rollers 219 and 220', one of said rollers, for example, the rear roller 220' being mounted either on or near and operatively connected with and adapted to be driven by the shaft 48 already described, or other suitable means.

The lower toothed feed chains 38 are mounted on rear driving sprocket wheels 44 fixed to the driving shaft 48, which is an extension of or connected and adapted to rotate with the shaft 124 already described. (See Figs. 1, 2, 3 and 4.) The forward extremities of said chains 38 are mounted upon forward idler sprocket wheels 45 located forward of the sickle and cutter-supporting bar, and between upper toothed feed chains 37. The idler wheels 44 and 45 which support the feed chains 38 are supported upon suitable frames or arms 47 which project forward over and in front of the cutter and between the upper feed chains 37 on said frames 43, from behind the cutter-supporting bar and sickle, the rear extremities of said arms 47 and arms or frames 43 being, by preference, supported upon the driving shaft 48, which is, by preference, an extension of the shaft 124 already described, and which drives the chains 37 and 38. The forward idler sprocket wheels 45 are supported upon the forward extremities of corresponding frames or supporting arms 47 upon suitable short axles. And the sprocket wheels 44 and 45 are in the same vertical plane, so that the upper and lower laps of each toothed feed chain 38 are in the same vertical plane, and the lower lap of each of said chains moves forward with its foldable teeth in retracted or folded position while the upper feeding lap of such chain moves rearward in the same vertical plane and with the foldable teeth extended and in feeding engagement with the cut stalks and un-cut stalks to be operated upon.

The upper chain-supporting arms 43 may be triangular in form and comprise a bottom frame arm 50 having forked arms at its forward extremity which extend on opposite sides of and support the corresponding front idler wheel 40, and having rear forked arms at the rear extremity of said arm 50 which extend on opposite sides of the corresponding driving sprocket 44. And each of said frames 43 is, by preference, provided with an upper inclined frame arm 56 having forked arms 57 at its forward extremity on opposite sides of a corresponding forward sprocket 40 and rear forked arms 60 at its upper end which extend on opposite sides of a corresponding upper idler sprocket 41 and in supporting engagement with the axle of such sprocket wheel. And the rear extremities of the frame arms 47 and 56 of each frame 43 are connected by means of an upright frame member 53, which may have forked arms at its top and bottom extremities and adapted to extend on opposite sides of the sprocket wheels 39 and 41 mounted in such frames respectively.

Each upper chain-supporting frame 43 is, by preference, provided with a top shield in the form of an inclined flat strip 88 which extends over and in parallel relation to the top lap of the corresponding feed chain 37, and with a bottom frame member 86, the forward end 85 of which is connected with the forward end of the shield or strip 88, and forms a sharp nose for the chain-supporting frame 43, which nose is adapted to enter between the standing stalks of hemp in advance of the cutter and part the stalks so that they will admit the chains and chain supporting frames by which the stalks are held up and conveyed rearward. An upright frame member 82 on the rear extremity of each frame 43 is supported on the shaft 48 and connected with the rear extremities of the inclined shielding strip 88 and bottom frame arm 86 of such frame 43. And each frame 43 and bottom frame 47, respectively, is provided with a pair of tapered stripper plates 75 located on opposite sides thereof and adapted to engage and strip the stalks from the toothed feed chains 37 and 38 at the rear extremity of the upward and rearward path of movement of the feeding laps of said chains, so that the extended feeding teeth are permitted to fold inward and downward immediately after passing over said stripper plates.

The lower feed chain supporting arms or frame 47, by preference comprise upper channel members having side flanges 69 for engaging and holding in extended position the foldable teeth 66 of the feed chains supported by said frames respectively. And the upper feed-chain supporting members or frames 43 also comprise similar upper inclined channel members 56 having upwardly projecting parallel side flanges 67 which are adapted to engage and hold in raised extended position the foldable feeding teeth 66 of the feed chains supported by said frames. The channels or flanges 67 and 69 terminate at the rear extremity of the chain-supporting frames of which they form a part, and are adapted to release and permit the foldable teeth of the chains engaged by said flanges to drop or fold downward as they pass over the stripper plates 75. (See Figs. 3, 4, 5, and 6.)

Hollow sleeves or bushings 55 are interposed between the shaft 48 and the forked arms of the frame members which form the lower feed-chain supporting frames 47. And similar bushings 62 connect the upper ends of the frame members which form the upper frames 43 which support the chains 37. (See Figs. 3, 4, 5, and 6.) Similar bushings are also provided and mounted in position to encircle the stub shafts of the wheels 40 and 45 which support the forward extremities of the toothed feed chains 37 and 38 respectively.

The endless toothed feed chains 37 and 38, in their preferred form, consist of or comprise a series of chain links which are so constructed and connected as to form a block chain having side link members 81 arranged in pairs on opposite sides of perforated blocks 80, said side link members and blocks being connected by means of transverse pivot pins as shown in Figs. 9 to 12 inclusive.

Each pair of angular foldable teeth 66 is mounted, by preference, upon a block 80 of the chain, each of said blocks being provided with upwardly projecting lugs 77 which are by preference, integral with the body of the block. In each pair of said lugs 77 is mounted a pivot pin or pintle 75 which extends lengthwise of the chain. And pivotally mounted on each of said pintles or pivot pins 76 is a pair of feeding teeth 66 each of which is provided with a loop portion at its inner end through which the pin 76 extends. The foldable feeding teeth 66 are thus adapted to swing upward to extended position as shown in Fig. 11 and in Figs. 4, 5, and 6, and downward to folded or retracted position, as shown in Figs. 4, 5, and 6.

In the form of the machine shown in Figs. 1, 2 and 3 of the drawings, a transverse endless conveyor 208 of canvas or other suitable material, having ribs 209 thereon, is mounted at one extremity of said endless conveyor on a driving roller 210, and at its opposite extremity, on an idler roller 211. The driving roller 210 is fixed to an axle or shaft 212 journaled in suitable bearings 213 on the machine frame or bottom frame 18'. A bevel gear wheel 214 is fixed to the shaft 212 and in toothed engagement with a bevel gear wheel 215 fixed to the shaft 124, said shaft having a spur gear 129 fixed thereto and in toothed engagement with the main driving spur gear wheel 130 on the traction wheel 119, as already described.

The transverse endless conveyor 208 is located back of the forward endless flexible toothed conveyor chains 37 and 38 already described, and in position to move transversely with said upper lap of the endless conveyor 208 in supporting engagement with the butts of the stalks to be operated upon.

The idler roller 211 is mounted in bearings 215' on the bottom frame 18' of the machine, said frame being supported upon the traction wheel 119 and a relatively small wheel 216, and adapted to be adjusted upward and downward with respect to the axle 121 by means of the usual adjusting screws 167 and 217, so as to raise and lower the cutter and forward endless conveyors 37, 38 and their supporting frames 43 and 47 and the stalk supporting bed or frame 18' and mechanism supported on said frame. Flexible or endless conveyor belts or aprons 218 are mounted between the flexible conveyors 37 and 38, upon forward idler rolls 219, which support the forward extremities of said endless conveyor aprons, and supporting rollers 220' which support the rear extremities of the aprons. The rollers 220' may be fixed to the driving shaft 48, or operatively connected with said shaft 48 which is an extension of the shaft 124, by means of suitable gears, or gear and sprocket mechanism, or other suitable connecting means.

A shield 221 overlaps the rear extremities of the endless aprons 218 and the forward margin of the endless conveyor 208.

To further insure the uniform and orderly arrangement and depositing of the stalks across and transverse to the path of the traction wheel or machine, a stalk-receiving reel member 114 is provided for receiving the stalks from the conveyor 208 and depositing them upon the ground, or for supporting them while being bound in bundles or arranged in position to be bound upon such reel or upon a binding table or other support.

The rear tranvserse conveyor 208 extends beneath the curved shield 280 and transversely with respect to the path of movement of the foldable toothed conveyor chains 37 and 38 and in position to receive cut stalks as they are delivered onto said endless conveyor by said foldable-toothed feed chains.

Curved downwardly inclined stalk-engaging and guiding rods 113 are mounted in position to extend transversely and downward and outward at an inclined over and rearward with respect to the endless transverse conveyor 208, and are supported by suitable braces 115 and the outer frame member 24 in position to engage the stalks as they are carried transversely on the said endless conveyor. The stalks are thus guided transversely and lowered by said inclined rear rods 113 during the transverse movement of the stalks upon the endless conveyor. And rear toothed feed chains 222 are mounted on suitable supports such for example as idler wheels 112, 111, and their supporting upright frame members, in position to engage and feed the stalks transversely on the conveyor 208.

I claim:

1. In a machine of the class described, the combination of a series of forward conveyor members each having stalk-engaging teeth thereon adapted to move rearward in extended stalk-engaging position above the level of the back of a sickle, portable supporting means upon which said toothed conveyor members are mounted, stalk-supporting means on said portable conveyor-supporting means and adapted to support stalks located back of such sickle, endless transverse conveyor mechanism located back of and having an upper stalk-engaging portion movable transversely with respect to the rearwardly movable stalk-engaging toothed portions of said forward conveyor member, a traction wheel, and means for operatively connecting said forward conveyor members and said transverse endless conveyor mechanism with the traction wheel.

2. In a machine of the class described, the combination of a series of forward conveyor members each having a rearwardly movable toothed stalk-engaging portion located above the level of and extending back of a sickle, portable supporting means upon which said toothed conveyor members are mounted, stalk-supporting means on said portable conveyor-supporting means and adapted to support stalks located between said forward toothed conveyor members and back of such sickle, endless transverse conveyor mechanism located back of and having an upper stalk-engaging portion movable transversely with respect to the rearwardly moving stalk-engaging portion of said forward toothed conveyor members, downwardly and rearwardly inclined stalk-engaging and guiding means located back of said transverse conveyor mechanism and extending transversely across the path of movement of said forward toothed conveyor members, and means for operating said forward conveyor members and said transverse endless conveyor mechanism.

3. In a machine of the class described, the combination of a sickle, forward endless conveyor mechanism comprising a series of flexible endless conveyor members each having an upper rearwardly movable stalk-engaging lap and a lower forwardly movable return lap both located in the same vertical plane and adapted to extend above the level of and back of the sickle, portable supporting means upon which said forward conveyor members are mounted, a driving shaft operatively connected with and extending transversely across said series of flexible endless conveyors back of and in approximately parallel relation to the sickle, a traction wheel, means for operatively connecting the sickle with the traction wheel, and means for operatively connecting said driving shaft with the traction wheel.

4. In a machine of the class described, the combination of a sickle, a series of parallel endless conveyor chains each having a rearwardly movable feeding lap and a return lap both located in substantially the same vertical plane, endless conveyor mechanism mounted between said first-mentioned conveyor chains and each having an upwardly and rearwardly inclined upper feeding lap extending above the level of the adjacent conveyor chains of said first-mentioned series, foldable feeding teeth pivotally mounted on all of said chains, means for moving said teeth successively to extended position in advance of the sickle, means for moving said teeth to retracted position back of the sickle, a portable supporting frame, a chain-driving shaft mounted on said supporting frame and normally extending transversely with respect to and operatively connected with all of said conveyor chains, a traction wheel, means for operatively connecting said sickle with the traction wheel, and means for operatively connecting said chain-driving shaft with the traction wheel.

5. In a machine of the class described, the combination of a sickle, a series of parallel endless conveyor chains each having a rearwardly movable feeding lap and a return lap both located in substantially the same vertical plane and extending forward beyond and rearward with respect to the sickle, endless conveyor chains mounted between said first-mentioned conveyor chains and each having an upwardly and rearwardly inclined upper feeding lap extending above the level of the feeding lap of the adjacent conveyor chains of said first-mentioned series, feeding teeth pivotally mounted on each of said chains respectively, and adapted to be moved to laterally projecting extended position, guiding means in guiding engagement with said chains, means for moving said teeth to extended position in advance of the sickle, tooth-engaging means located back of the sickle and adapted to move said teeth to retracted position, a normally horizontal chain-driving shaft extending transversely of and operatively connected with all of said conveyor chains, a portable supporting frame upon which said chain-driving shaft is rotatively mounted, a traction wheel, means for operatively connecting the sickle with the traction wheel, and means for operatively connecting said chain-driving shaft with the traction wheel.

Signed at Chicago, in the county of Cook and State of Illinois, this 9th day of August, 1924.

HARRY IRWIN CROMER.